(12) United States Patent
Groth et al.

(10) Patent No.: US 9,022,718 B2
(45) Date of Patent: May 5, 2015

(54) SAFETY MECHANISM FOR A PAPER STACK CART SYSTEM

(75) Inventors: Ronald E Groth, Penfield, NY (US); Charles R Brewer, III, Farmington, NY (US); Thomas C Palumbo, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1559 days.

(21) Appl. No.: 12/392,319

(22) Filed: Feb. 25, 2009

(65) Prior Publication Data

US 2010/0104410 A1 Apr. 29, 2010

Related U.S. Application Data

(63) Continuation-in-part of application No. 12/257,538, filed on Oct. 24, 2008.

(51) Int. Cl.
*B65G 67/00* (2006.01)
*B62B 5/00* (2006.01)
*B62B 1/14* (2006.01)
*G03G 15/00* (2006.01)

(52) U.S. Cl.
CPC ............. *B62B 5/0026* (2013.01); *B62B 1/14* (2013.01); *B62B 5/0006* (2013.01); *G03G 15/6552* (2013.01); *B62B 5/0069* (2013.01); *B62B 2202/64* (2013.01); *B62B 2203/10* (2013.01); *B62B 2301/00* (2013.01)

(58) Field of Classification Search
USPC ............. 414/349, 608; 280/33.997, 33.998, 280/47.35
See application file for complete search history.

(56) References Cited

U.S. PATENT DOCUMENTS

| | | | | | |
|---|---|---|---|---|---|
| 3,854,616 | A | * | 12/1974 | Willis et al. | 414/607 |
| 3,937,339 | A | * | 2/1976 | Geis et al. | 414/697 |
| 4,042,135 | A | * | 8/1977 | Pugh et al. | 414/718 |
| 4,068,773 | A | * | 1/1978 | Downing et al. | 414/636 |
| 4,714,399 | A | * | 12/1987 | Olson | 414/621 |
| 5,241,297 | A | * | 8/1993 | Goodman | 340/568.8 |
| 6,092,976 | A | * | 7/2000 | Kamiya | 414/636 |
| 6,591,593 | B1 | * | 7/2003 | Brandon et al. | 56/10.6 |

OTHER PUBLICATIONS

U.S. Appl. No. 12/209,287, filed Sep. 12, 2008, and entitled "A Lifting Mechanism with a Tilting Platform for Transferring Paper Stacks" by Charles R. Brewer III, et al.
U.S. Appl. No. 12/209,539, filed Sep. 12, 2008, and entitled "Stacker Cart" by Charles R. Brewer III, et al.
Continuation-in-Part U.S. Appl. No. 12/257,538, filed Oct. 24, 2008, and entitled "Stacker Cart" by Charles R. Brewer III, et al.

* cited by examiner

*Primary Examiner* — Scott Lowe

(57) ABSTRACT

A safety feature prevents a two wheeled electric paper lift from raising a paper tray on uneven ground that includes a tilt switch positioned in parallel with an upper limit switch that controls the height in a vertical direction of the paper tray. When a tilt angle of the paper lift is greater than 5° the tilt switch will prevent the paper tray from being raised and thereby prevent the load on the paper tray from shifting or tipping over and causing injury to an operator.

17 Claims, 3 Drawing Sheets

SAFETY MECHANISM FOR A PAPER STACK CART SYSTEM

Cross-reference is hereby made to commonly assigned and U.S. application Ser. No. 12/209,287, filed Sep. 12, 2008, now U.S. Publication No. 20100066014 and entitled "A Lifting Mechanism with a Tilting Platform for Transferring Paper Stacks" by Charles R. Brewer III, et al; U.S. application Ser. No. 12/209,539, filed Sep. 12, 2008, now U.S. Publication No. 20100068019 and entitled "Stacker Cart" by Charles R. Brewer III, et al; and Continuation-in-Part U.S. application Ser. No. 12/257,538, filed Oct. 24, 2008, now U.S. Publication No. 20100068026 and entitled "Stacker Cart" by Charles R. Brewer III, et al. The disclosures of the above-mentioned applications are incorporated herein by reference.

This disclosure relates to paper handling systems, and more specifically, to a safety feature that prevents a paper lift device of a paper handling system from functioning if a surface on which the device is positioned it is not within a predetermined degree of evenness.

The safety feature of the of the present disclosure can be effectively used in a plurality of paper-handling or non-marking systems, however, herein it will be described as used with finishing modules of electrostatic marking systems, such as, xerography or electrophotography.

Marking systems that transport paper or other media are will known in the art. These marking systems include electrostatic marking systems, non-electrostatic marking systems, printers or any other system where paper or other flexible media or receiving sheets are transported internally to an output device, such as, a stacker cart in a finisher and compiler. Many of these machines are used for collecting or gathering printed sheets so that they may be formed into, books, pamphlets, forms, sales literature, instruction books and manuals and the like. Often, the loaded stacker cart is emptied or the paper stack unloaded to another surface.

The finisher and compiler are generally located at a site in these marking after the receiving sheets (paper) have been toned or marked. A finisher is generally defined as an output device that has various post printer functions or options, such as, hole punching, corner stapling, edge stapling, etc. After the paper has been finished or compiled, it is transported to a paper cart in a paper stacking housing in the finisher module. From there, this paper stack may be moved to other locations for collection.

The paper after finishing is collected onto a stacker cart that is usually located on a bottom portion of a housing of the finisher module of the printing system. The stacker cart has wheels so that it can be easily rolled out of the lower finisher module housing to some other location or surface. Since the paper stack on the stacker cart is heavy, it needs mechanical or other lifting assistance to lift the stack off the stacker cart after it leaves the lower housing of the finisher module.

The lift device in U.S. application Ser. No. 12/209,287, now U.S. Publication No. 20100066014, employs a platform for loading and transporting a load of media, such as, paper from one station to another and includes an upper limit switch which prevents the load from being raised when it reaches the upper limit. Presently, there is no feature to prevent the load from being raised when the lift device is tilted or on uneven ground. The possibility of the load shifting or tipping over and causing injury is currently dependent on the lift's operator since there is no feature in the lift devices to detect tilt angle.

Accordingly, disclosed herein is an answer to the above-identified problem that includes positioning a tilt switch capable of detecting a 5° angle in parallel with the upper limit switch. When the angle of the lift is greater than 5° the tilt switch will trip which will prevent the load from being raised since the lift's control system believes the load has reached the upper limit. When the lift is on level ground the upper limit switch will operate as it normally would.

Various of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

Figure 1:
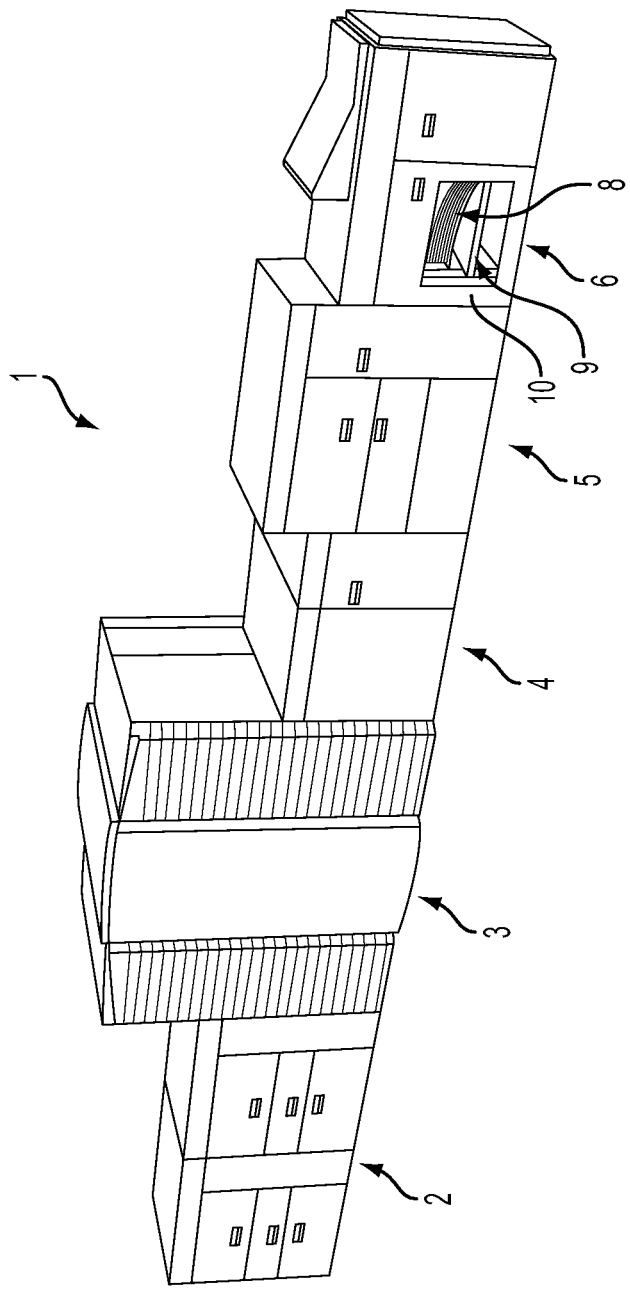
FIG. 1 is a perspective view of a typical printing system with a stacker cart inside a tower positioned housing of a finisher module.
Figure 2:
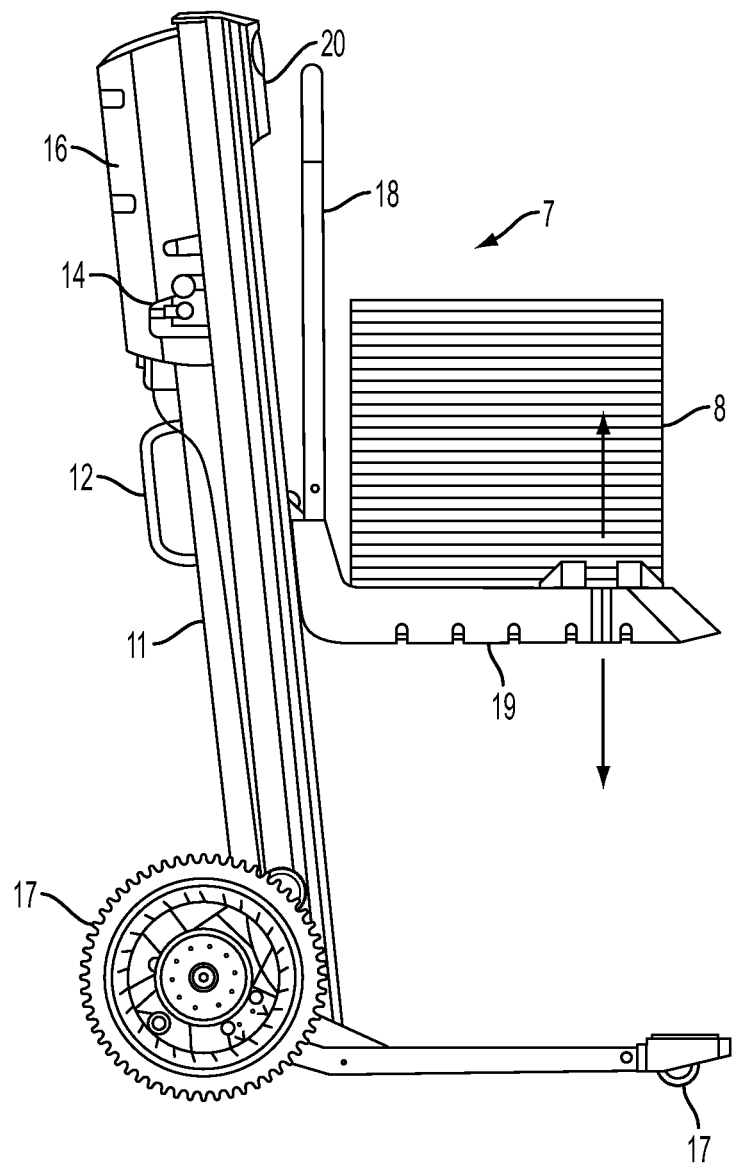
FIG. 2 is a schematic side view of an embodiment of the lifting mechanism of this disclosure.

In FIG. 1, a typical printing system 1 suitable for use with the lifting mechanism of the present disclosure is disclosed. This printing system 1 comprises a paper feeder module 2, a printing module 3, an inverter module 4, an inserter module 5, and a finisher module 6. The lifting mechanism 7 in FIG. 2 of this disclosure can be used, however, with any paper handling system, both marking systems and non-marking (paper handling) systems. The lift mechanism 7 of this disclosure employs a motor to lift a platform that holds paper, however, any suitable mechanical or electrical lift mechanism could be employed. FIG. 1 shows a finisher module 6 having a finished media or paper stack 8 supported on a finisher stacker cart 9 as viewed through a window of the finisher module door 10. Once the paper stack 8 is completed, it and stacker cart 9 are to be removed from finisher module 6 to another location. The stacker cart 9 has wheels which enable it to be easily rolled out of finisher module 6. Once the stacker cart 9 is removed, from finisher module 6, it is rolled adjacent to the lifting mechanism 7.

Lift mechanism 7 is configured to move a stack of paper from one location to the next and comprises an L-shaped portion of upright support member 11 connected to front and back wheels 17 that enable the movement of the paper up and down on platform or paper tray 19 through a conventional motor (not shown) positioned between and drivingly connected to the wheels. A stack guide 18 is included to provide an alignment edge for stack 8. Lift mechanism 7 has an electrical lifting capacity enabled to lift the stack of paper to desired height. It should be understood that the lifting capacity could be manually enabled, if desired. The upright support portion 11 of lift 7 includes a handle 12 for manually maneuvering the lift, if necessary. However, the lift is controlled electrically by conventional wiring and mechanisms in housing 16 through handle bar 14. An upper limit switch 20 is included which stops paper tray 19 from being raised when the upper limit is reached.

Figure 3:
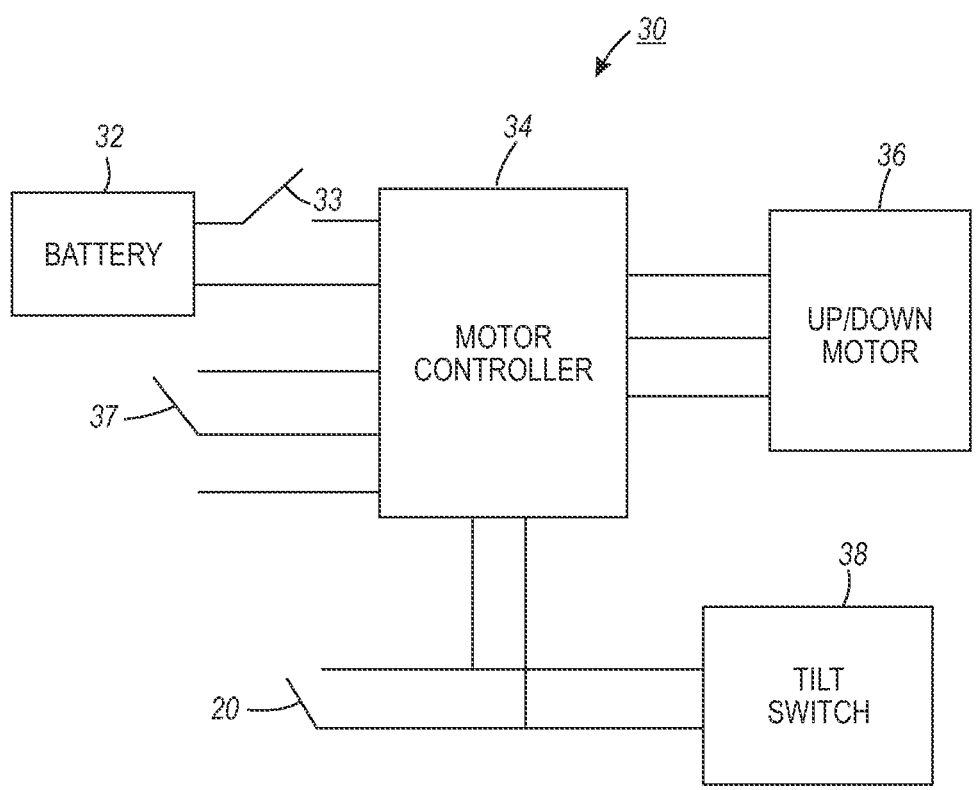
FIG. 3 is a block diagram showing the positioning of a tilt switch in the control system of the lift mechanism to control a motor of the lifting mechanism in accordance with the present disclosure.

In FIG. 3, and in accordance with the present disclosure, an improvement to the paper stack system of U.S. application Ser. No. 12/209,287, now U.S. Publication No. 20100066014, is shown that comprises a tilt switch 38 (which is preferably a mercury switch) which prevents lift 7 from raising its load on uneven ground, and thus, avoids the possibility of tipping over. Also, if the lift is moving, tilt switch 38 will cause the motor to shut down and the paper stack to be lowered if the lift becomes tilted more than 5°, as could happen during transport over an uneven floor. As shown in block diagram 30 of FIG. 3, a battery 32 is connectable to motor 36 through motor controller 34 to provide power to lift and lower paper tray 19. Up and down switch 37 actuates motor 36 and upper limit switch 20 closes when platform 19 has reached a predetermined height. Upper limit switch 20 is a single pole, single throw device that is wired into motor controller 34. When paper tray 19 is raised up substantially vertical support member 11, a conventional lever (not shown) is tripped which closes upper limit switch 20 and stops the motor. By wiring a tilt switch 38 in parallel with upper limit switch 20 paper tray 19 will also be prevented from being raised when the lift 7 is tilted more than 5°. Thus, tilt switch 38 ensures that when lift 7 is on an uneven surface paper tray 19 cannot be raised. This will prevent a heavy load of paper from shifting or falling over and thereby provide additional safety for an operator.

It should now be understood that a safety feature has been disclosed that prevents a two wheeled electric paper lift from raising its load on uneven ground that includes a tilt switch positioned in parallel with an upper limit switch that controls the height in a vertical direction of a paper tray. When the angle of the paper lift is greater than 5° the tilt switch will prevent paper loaded on the paper tray from being raised since the lift believes the load has reached the upper limit. In addition, the tilt switch triggers shutdown of a motor of the paper lift during transport if the paper lift travels over an uneven floor that causes the paper lift to tilt at an angle greater than 5°.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A lift mechanism configured to move a load from one location to another location includes a safety arrangement that prevents said lift mechanism from raising its load while on an uneven surface, comprising:
    a power supply connected to said lift mechanism;
    a motor connected to said power supply and to said lift mechanism;
    wheels enabled by said power supply through said motor to drivingly move said lift mechanism from said one location to said another location;
    a movable platform adapted for holding said load and up and down movement;
    a controller for controlling said up and down movement of said movable platform;
    a limit switch for preventing said load from being raised when it reaches a predetermined upper limit; and
    a tilt switch capable of detecting when said lift mechanism is on said uneven surface and tilted at an angle greater than 5° with respect to a horizontal plane and thereby ensuring that tipping of the load will not occur.

2. The lift mechanism of claim 1, wherein said limit switch and said tilt switch are connected in parallel.

3. The lift mechanism of claim 2, wherein said tilt switch is a mercury switch.

4. The lift mechanism of claim 1, wherein said tilt switch will prevent said platform from being raised from its unraised position when said tilt angle of said lift mechanism is greater than 5°.

5. The lift mechanism of claim 4, including a switch connected to said motor controller for controlling up and down movement of said movable platform.

6. The lift mechanism of claim 5, including a switch for activating said power supply.

7. The lift mechanism of claim 6, wherein said power supply is a battery.

8. The lift mechanism of claim 1, wherein said motor of said lift mechanism is shut down and said load is lowered if said lift mechanism becomes tilted beyond said 5° angle during transport over said uneven surface.

9. A lift apparatus that moves a stack of media from one point to another point and having a safety system that prevents tipping over of said stack of media while said lift apparatus is moving over an uneven surface, comprising:
    a motor;
    a power supply connected to said motor;
    wheels enabled by said motor and power supply to drivingly move said lift apparatus from said one point to said another point;
    a movable media tray adapted for holding said stack of media and up and down movement;
    a controller for controlling said up and down movement of said movable media tray;
    a limit switch for preventing said stack of media from being raised after it reaches a predetermined upper limit; and
    a tilt switch positioned in parallel with said limit switch and configured to detect when said lift apparatus is moving over said uneven surface and at an angle greater than 5° with respect to a horizontal plane and disable said motor.

10. The lift apparatus of claim 9, wherein said tilt switch is a mercury switch.

11. The lift apparatus of claim 10, wherein said tilt switch will prevent said movable media tray from being raised from its initial position when said tilt angle of said lift apparatus is greater than 5°.

12. The lift apparatus of claim 11, including a switch connected to said motor controller for controlling up and down movement of said movable media tray.

13. The lift apparatus of claim 12, including a switch for activating said power supply.

14. The lift apparatus of claim 13, wherein said power supply is a battery.

15. The lift apparatus of claim 9, wherein said stack of media is lowered if said lift apparatus becomes tilted beyond said 5° angle during transport over an uneven surface.

16. A method for preventing a lift mechanism positioned on an uneven surface from lifting a stack of media, comprising:
    providing a power supply connected to said lift mechanism;
    providing a motor connected to said power supply and to said lift mechanism;
    providing wheels enabled by said power supply through said motor to drivingly move said lift mechanism from said one location to said another location;
    providing a movable platform adapted for holding said stack of media and up and down movement;
    providing a controller for controlling said up and down movement of said movable platform;
    providing a limit switch for preventing said stack of media from being raised when it reaches a predetermined upper limit; and
    providing a tilt switch capable of detecting when said lift mechanism due to being positioned on an uneven surface is tilted at an angle greater than 5° with respect to a horizontal plane and sends a signal to said controller which then prevents said lift mechanism from raising its load from its initial position on uneven surface, thereby avoiding the possibility of tipping over.

17. The method of claim 16, including connecting said limit switch and said tilt switch in parallel.

* * * * *